United States Patent
Wallace et al.

(10) Patent No.: US 9,452,892 B2
(45) Date of Patent: Sep. 27, 2016

(54) CONVEYOR BELT RIP DETECTION SYSTEM WITH MICROWIRE SENSOR

(71) Applicants: Jack Bruce Wallace, Powell, OH (US); Charles Edwards, Big Prairie, OH (US); Robert Eugene Leib, Richwood, OH (US)

(72) Inventors: Jack Bruce Wallace, Powell, OH (US); Charles Edwards, Big Prairie, OH (US); Robert Eugene Leib, Richwood, OH (US)

(73) Assignee: Veyance Technologies, Inc, Fairlawn, OH (US)

(*) Notice: Subject to any disclaimer, the term of this patent is extended or adjusted under 35 U.S.C. 154(b) by 0 days.

(21) Appl. No.: 14/554,267

(22) Filed: Nov. 26, 2014

(65) Prior Publication Data

US 2015/0151922 A1    Jun. 4, 2015

Related U.S. Application Data

(60) Provisional application No. 61/911,138, filed on Dec. 3, 2013.

(51) Int. Cl.

| | |
|---|---|
| B65G 43/02 | (2006.01) |
| H01B 3/28 | (2006.01) |
| H01B 7/06 | (2006.01) |
| B65G 15/36 | (2006.01) |

(52) U.S. Cl.
CPC .......... *B65G 43/02* (2013.01); *H01B 3/28* (2013.01); *H01B 7/06* (2013.01); *B65G 15/36* (2013.01)

(58) Field of Classification Search
CPC ........ B65G 43/02; B65G 15/36; H01B 3/28; H01B 1/023; H01B 7/06
USPC .................................................... 198/810.02
See application file for complete search history.

(56) References Cited

U.S. PATENT DOCUMENTS

| | | | | |
|---|---|---|---|---|
| 3,636,436 A | * | 1/1972 | Kurauchi | G01N 27/90 198/810.02 |
| 3,731,786 A | | 5/1973 | Nagata et al. | 198/40 |
| 3,742,477 A | | 6/1973 | Enabnit | 198/810.02 |
| 3,922,661 A | | 11/1975 | Enabnit | 198/810.02 |
| 4,621,727 A | * | 11/1986 | Strader | B65G 43/02 198/810.02 |
| 4,854,446 A | | 8/1989 | Strader | 198/810.02 |
| 6,352,149 B1 | * | 3/2002 | Gartland | B65G 43/02 198/810.02 |
| 6,715,602 B1 | | 4/2004 | Gartland | 198/810.02 |
| 7,178,663 B2 | * | 2/2007 | Schnell | B65G 43/02 198/810.02 |
| 8,069,975 B2 | * | 12/2011 | Wallace | B65G 45/02 198/810.02 |
| 2007/0068609 A1 | * | 3/2007 | Saleh | B21C 1/003 148/685 |
| 2008/0202643 A1 | | 8/2008 | Saleh | 148/536 |
| 2014/0166070 A1 | * | 6/2014 | Gaynes | H01L 31/024 136/246 |

FOREIGN PATENT DOCUMENTS

| | | | | |
|---|---|---|---|---|
| AU | 442872 | * | 7/1969 | |
| AU | 442872 B2 | * | 11/1973 | B65G 43/02 |

OTHER PUBLICATIONS

European Search Report, EP14194886.9.

* cited by examiner

*Primary Examiner* — Leslie A Nicholson, III
*Assistant Examiner* — Keith R Campbell
(74) *Attorney, Agent, or Firm* — Alvin T. Rockhill

(57) ABSTRACT

A conveyor belt comprising (1) an elastomeric body having a load carrying surface and a parallel pulley engaging surface; (2) a reinforcement ply disposed within the elastomeric body; (3) a rip detection sensor in the form of a microcoil sensor wire which is configured in an endless loop, wherein the microcoil sensor wire is comprised of an elastomeric core having an electrically conductive wire spirally wrapped around the elastomeric core.

20 Claims, 2 Drawing Sheets

CONVEYOR BELT RIP DETECTION SYSTEM WITH MICROWIRE SENSOR

This application claims the benefit of U.S. Provisional Patent Application Ser. No. 61/911,138, filed on Dec. 3, 2013. The teachings of U.S. Provisional Patent Application Ser. No. 61/911,138 are incorporated herein by reference in their entirety.

BACKGROUND OF THE INVENTION

Conveyor belts are widely used for moving minerals, coal, and a wide variety of manufactured products from one point to another. Heavy duty conveyor belts used in mining operations can extend over distances of several miles and represent a high cost component of an industrial material handling operation. Unfortunately, such conveyor belts are susceptible to damage from the material transported thereon and a rip, slit, cut or tear may develop within the belt. For instance, sharp edges of the material being transported can gouge the surface of the belt and that can result in a rip developing.

After being detected a torn or ripped belt can be repaired. However, the cost of repairing a heavy duty conveyor belt and cleaning up material spilled as a result of the damage can be substantial. In cases where such damage is not detected and repaired promptly, the rip typically propagates along the length of the belt with continued use of the conveyor system which makes the repair even more difficult and costly. It is accordingly desirable to detect damage to the belt as soon as possible after it occurs and to quickly repair the damaged area of the belt. By doing so the extent of the damage to the belt can be minimized and the spillage of material being conveyed can be reduced.

Over the years, a number of systems have been developed for detecting belt damage and for automatically stopping further movement of the belt after the damage occurs. It is well known to employ sensors within conveyor belts as part of a rip detection system. In a typical system, sensors in the form of loops of conductive wire are affixed or embedded in the belt and provide a rip detection utility as part of an overall rip detection system. Rip detection is achieved through the inferential detection of an "open circuit" condition in one or more of the sensor loops in the belt. Typically, an electrical energy source external to the belt is inductively or capacitively coupled to a sensor loop in the belt. A break in the conductive wire loop of the sensor may be detected by a remote transmitter/receiver (exciter/detector). Disposition of a plurality of such sensors at intervals along the conveyor may be effected with each sensor passing within read range of one or more exciter/detectors at various locations. In this manner, the existence of a tear will be promptly detected and repaired with further damage to the belt being minimized.

U.S. Pat. No. 3,742,477 discloses a "figure eight" sensor loop useful within a belt sensor system. U.S. Pat. No. 3,922,661 discloses an electronic control system for conveyor belts which monitors the condition of embedded sensor conductors in the belt and provides a warning indication and/or shutdown of the conveyor when damage occurs to the belt or control circuitry.

U.S. Pat. No. 4,621,727 discloses a reinforced conveyor belt having included therein a conductor for use in a rip monitoring system, said belt comprising: (a) an elastomeric body having an upper carrying surface and a parallel lower pulley engaging surface, each surface extending indefinitely in a direction of travel of the belt; (b) a plurality of reinforcement layers positioned within said elastomeric body; (c) a plurality of envelopes of low coefficient of friction material positioned within said elastomeric body and spaced apart in the direction of travel of the belt, wherein each envelope establishes a void area in said elastomeric body within said envelope; and (d) a shaped conductor positioned within said envelope such that said conductor is free to move within said void area during operation of said reinforced conveyor belt.

U.S. Pat. No. 4,854,446 discloses "figure eight" sensor loops disposed at intervals along a conveyor belt. This reference more specifically reveals an endless conveyor belt having a direction of travel comprising: (a) an elastomeric body having a load carrying surface and a parallel pulley engaging surface; (b) a reinforcement ply disposed within said elastomer body; and (c) a conductor, disposed within said belt in a predetermined pattern forming a closed current path; and wherein said conductor comprises a plurality of strength filaments or strands of a first metal wrapped about a conductive core of a second metal, said strength filaments or strands having a higher fatigue resistance than the conductive core, for increasing the fatigue resistance of the conductive core.

U.S. Pat. No. 6,715,602 discloses a conveyor belt incorporating within it a rip detection sensor comprising a conductor formed in an endless loop, characterized in that: the belt includes at least one transponder secured to the belt in coupled relationship with the conductor; and the transponder transmits information identifying the location of the conductor along the belt.

U.S. Pat. No. 6,352,149 discloses a system in which antennae are embedded in a conveyor belt to couple with an electromagnetic circuit consisting of two detector heads and an electronic package. Coupling occurs only when an antenna passes across the detector heads and can only occur when the loop integrity has not been compromised. U.S. Pat. No. 6,352,149 more specifically reveals a conveyor belt incorporating within it a rip detection sensor comprising a conductor formed in an endless loop arranged in a signal inverting configuration wherein the conductor crosses itself in at least one crossing place, characterized in that: the conductor is formed as microcoil springwire; the conductor crosses itself by crossing through itself such that the microcoil springwire resides substantially in a single plane throughout the sensor including the crossing places; and means for preventing short-circuiting of the conductor at the crossing places.

The performance and reliability of microcoil springwires utilized in conveyor belt rip detection systems, such as the system disclosed by U.S. Pat. No. 6,352,149, can be compromised due to breaks, micro-breaks, or partial breaks therein which are caused by the microcoil springwire being elongated beyond its breaking point during the normal operation of the belt or as a result of belt damage. In other words, the microcoil spring wire can be damaged during normal belt operations as a consequence of ordinary wear and tear or it can be damaged by a high level of strain which is encountered during a high elongation event which causes the belt to stretched beyond the levels encountered during normal operations. In any case, the microcoil sensor wires utilized in the rip detection systems of conveyor belts can are susceptible to damage which is typically the result of being elongated beyond the break point of the microcoil sensor wire. The presence of breaks, micro-breaks, or partial breaks in the microcoil springwire compromises its electrical properties and accordingly adversely affects the performance and reliability of the rip detection system. There is accordingly a need for microcoil springwires that are highly durable, less susceptible to damage, and which can be integrated into conventional conveyor belt rip detection systems. Such microcoil springwires must also be capable of functioning in a manner which does not compromise the functionality or reliability of the rip detection system of the conveyor belt.

SUMMARY OF THE INVENTION

The present invention relates to conveyor belts having rip detection systems which utilize microcoil sensor wires which offer improved durability as compared to conventional microcoil sensor wires, including microcoil springwires as described in U.S. Pat. No. 6,352,149. This is because the microcoil sensor wires utilized in the conveyor belt rip detection systems of this invention can be elongated to a higher degree without sustaining damage. This higher acceptable degree of elongation which can be experienced without causing damage increases the durability and service life of the rip detection system and allows for the conveyor belt to be used reliably over an extended time period without the need to replace damaged microcoil sensor wires within the rip detection system of the conveyor belt. This reduces maintenance costs and the downtime which would ordinarily be encountered for repairing rip detection systems damage relating to microcoil sensor wires therein. In any case, the conveyor belts of this invention have rip detection systems which offer extended service life, excellent reliability, and excellent durability during normal and unusual operating conditions.

The microcoil sensor wires employed in the conveyor belts of this invention have elongations to break of at least about 100%. Such microcoil sensor wires typically have an elongation to break within the range of 100% to 1000%. More typically, the microcoil sensor wires will have an elongation to break within the range of 200% to 500%. In many cases the microcoil sensor wires will have an elongation to break of at least 150% or 200%. In any case, the microcoil sensor wires have the ability to move relatively freely within the elastomeric body of the conveyor belt in cases the body of the conveyor belt is strained. This is in contrast to conventional wires which are more closely coupled with or bonded to the rubber of the elastomeric body of the conveyor belt with such conventional wires breaking when strains exceed the maximum elongation of the wire. However, the core material of the microcoil sensor wires employed in the conveyor belts of this invention have a higher elongation than the elastomeric material utilized in the body of the conveyor belt and the microsensor wires can stretch with the core increasing the amount of elongation that the microcoil sensor wire can achieve without incurring damage. The fact that it is not mechanically restricted by the elastomeric body of the conveyor belt through a mechanical means or by an adhesive or some other form of chemical bonding allows for more freedom to strain and not break or otherwise to incur damage during events that cause a high level of elongation. In other words, in cases where the microcoil sensor wire is insulated in a sheath it is not mechanically bound directly to the elastomeric body of the conveyor belt giving it a high degree of freedom of movement independent of the elastomeric body of the belt.

The subject invention reveals a conveyor belt including (1) an elastomeric body having a load carrying surface and a parallel pulley engaging surface; (2) a reinforcement ply disposed within the elastomeric body; and (3) a rip detection sensor in the form of a microcoil sensor wire which is configured in an endless loop, wherein the improvement in the conveyor belt comprises utilizing a microcoil sensor wire having an elastomeric core with an electrically conductive wire spirally wrapped around said elastomeric core.

The present invention more specifically discloses a conveyor belt comprising (1) an elastomeric body having a load carrying surface and a parallel pulley engaging surface; (2) a reinforcement ply disposed within the elastomeric body; and (3) a rip detection sensor in the form of a microcoil sensor wire which is configured in an endless loop, wherein the microcoil sensor wire is comprised of an elastomeric core having an electrically conductive wire spirally wrapped around the elastomeric core.

The present invention also discloses a conveyor system with a rip detection system which is comprised of (I) a conveyor belt comprising (1) an elastomeric body having a load carrying surface and a parallel pulley engaging surface; (2) a reinforcement ply disposed within the elastomeric body; and (3) a rip detection sensor in the form of a microcoil sensor wire which is configured in an endless loop, wherein the microcoil sensor wire is comprised of an elastomeric core having an electrically conductive wire spirally wrapped around the elastomeric core;

(II) a drive motor;
(III) a drive pulley which is driven by the drive motor;
(IV) a following pulley;
(V) a transmitter which is coupled with the sensor loops; and
(VI) an external receiver which is coupled with the sensor loops.

DETAILED DESCRIPTION OF THE INVENTION

Figure 1:
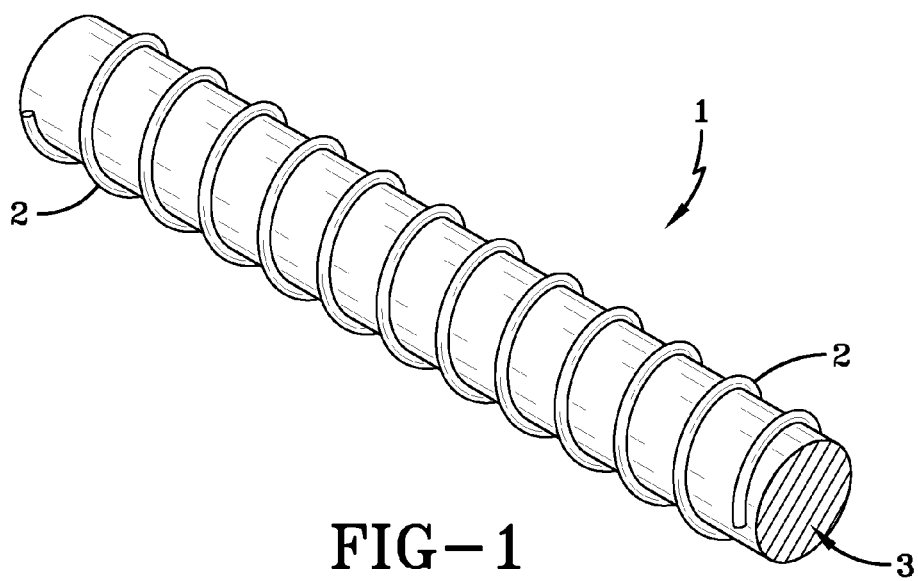
FIG. 1 is a schematic view of a microcoil sensor wire which can be used in the conveyor belt rip detector systems of this invention.
Figure 2:
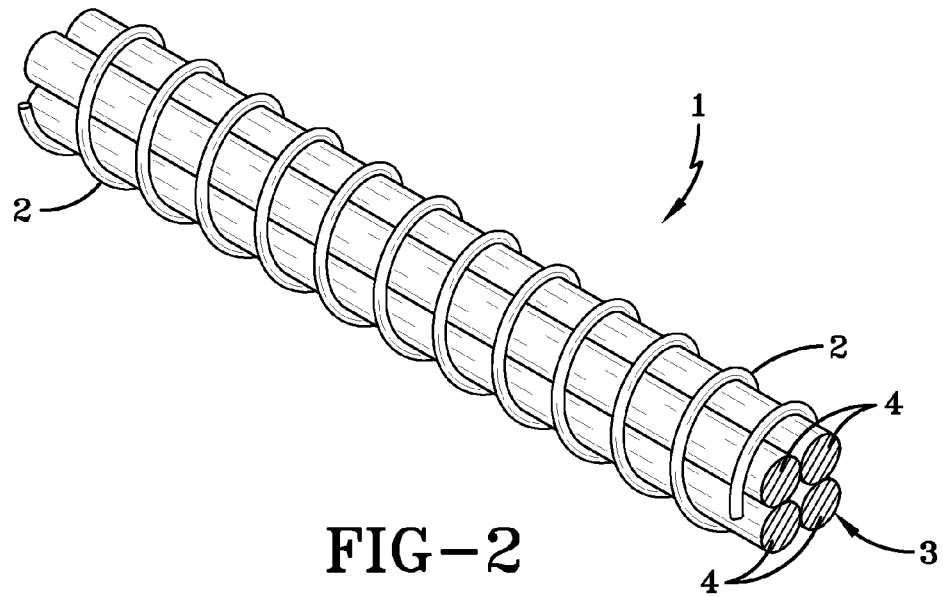
FIG. 2 is a schematic view of a microcoil sensor wire having multiple elastomeric filaments as its core which can be used in the conveyor belt rip detection systems of this invention

The conveyor belts of this invention include a rip detection sensor which is in the form of a microcoil sensor wire, wherein the microcoil sensor wire is configured in an endless loop and wherein the microcoil sensor wire is comprised of an elastomeric core having an electrically conductive wire spirally wrapped around the elastomeric core. Such a microcoil sensor wire 1 is illustrated in FIG. 1 wherein the electrically conductive wire 2 is spirally wrapped around a single elastomeric core 3. In another embodiment of this invention as depicted in FIG. 2 the elastomeric core 3 can be comprised of a plurality of elastomeric filaments 4 which form the elastomeric core 3. In any case, the elastomeric core 3 will be comprised of a rubbery material, such as a thermosetting rubber or a thermoplastic elastomer. For instance, the rubbery material can be natural rubber a synthetic rubber, such as a polydiene rubber. Some representative examples of materials that can be used as the elastomeric core include, but are not limited to, natural rubber, polyurethane-polyurea copolymer rubbers, synthetic polyisoprene rubber, polybutadiene rubber, styrene-butadiene rubber, nitrile rubber, ethylene-propylene rubber, and ethylene-propylene-diene monomer rubber, and the like.

The electrically conductive wire 2 can be comprised of a wide variety of electrically conductive metals. However, it is preferred for the metal to be a reasonably good conductor of electricity. For instance, the conductive metal can be copper, a copper alloy, aluminum, silver, or the like. It is most preferred for the metal to be a good conductor of electricity and to exhibit a high level of ductility. In one embodiment of this invention the electrically conductive wire is comprised of a copper alloy including from 0.2 to 0.6 weight percent chromium, 0.005 to 0.25 weight percent silver, and up to 0.015 weight percent zirconium with the balance of the alloy being copper. In another embodiment of this invention the electrically conductive wire is comprised of a copper alloy including from 0.2 to 0.6 weight percent chromium, 0.01 to 0.15 weight percent magnesium, and up to 0.015 weight percent zirconium with the balance of the alloy being copper. In still another embodiment of this invention the electrically conductive wire is comprised of a copper alloy including from 0.2 to 0.6 weight percent chromium, 0.005 to 0.25 weight percent silver, and up to 0.015 weight percent zirconium with the balance of the alloy being copper. In an alternative embodiment of this invention the electrically conductive wire is comprised of a copper alloy including from 1 to 4 weight percent nickel and 0.25 to 0.5 weight percent beryllium with the balance of the alloy being copper. United States Patent Publication No. 2008/0202643 A1 discloses some specific beryllium-copper alloys that can be used in the practice of this invention as the electrically conductive wire. The teachings of United States Patent Publication No. 2008/0202643 A1 are incorporated by reference herein for the purpose of teachings such beryllium-copper alloys. United States Patent Publication No. 2007/0068609 A1 discloses some specific copper alloys that can be used in the practice of this invention as the electrically conductive wire. The teachings of United States Patent Publication No. 2007/0068609 A1 are incorporated by reference herein for the purpose of teachings such copper alloys.

In some cases it may be desirable for the electrically conductive wire to be coated with silver, nickel or tin. In cases where the electrically conductive wire is coated it is typically coated with silver. In some cases it may be desirable for the microcoil sensor wire to be shielded with a polymeric electrical insulator. However, in many applications it is not necessary or desirable for the microcoil sensor wire to be shielded. In such applications the the microcoil sensor wire is not shielded and the conductive wire is not covered with an insulator.

Figure 3:
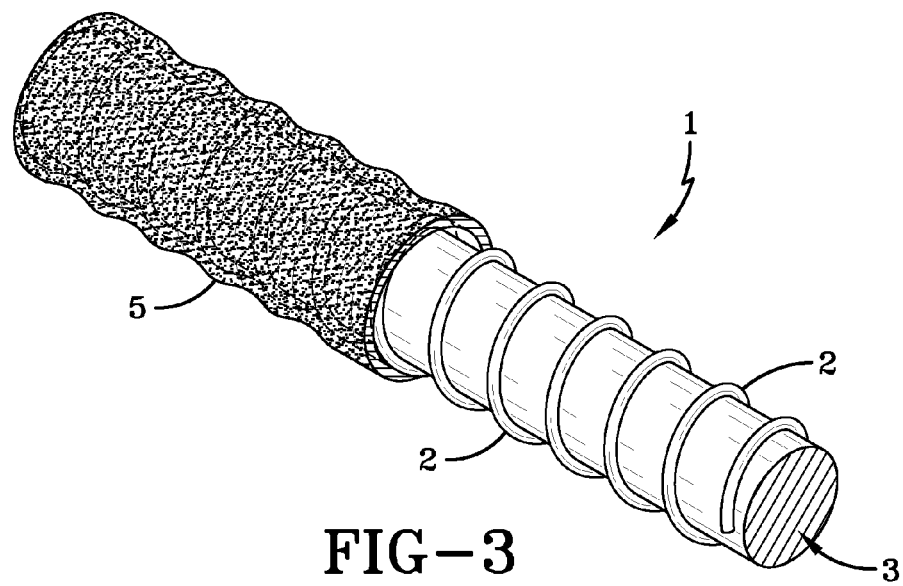
FIG. 3 is a schematic view of the microcoil sensor wire depicted in FIG. 1 wherein the microcoil sensor wire is shielded.
Figure 4:
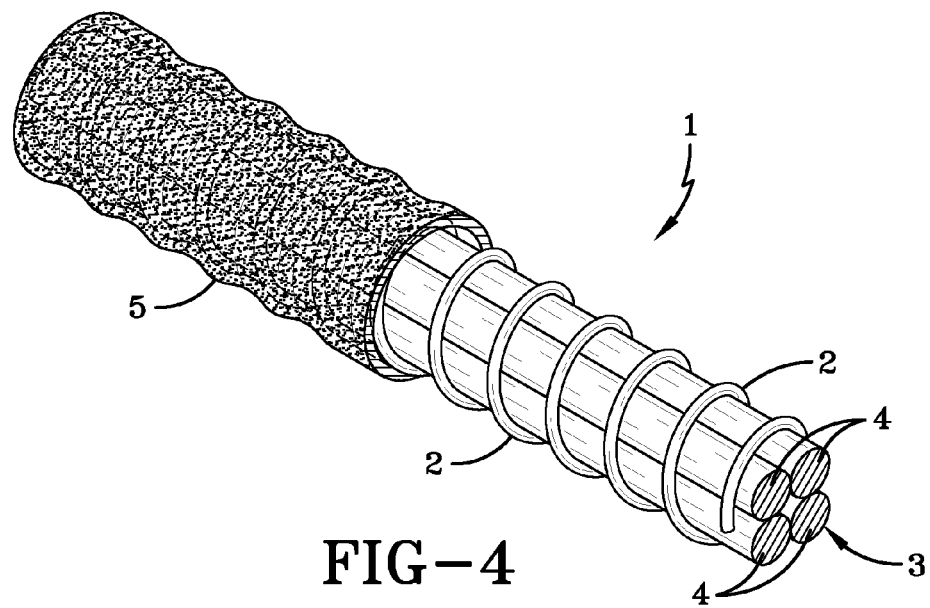
FIG. 4 is a schematic view of the microcoil sensor wire depicted in FIG. 2 wherein the microcoil sensor wire is shielded.

As previously noted, the microcoil sensor wire can optionally be shielded or insulated with a protective covering 5 as depicted in FIG. 3 and FIG. 4. This protective covering 5 will typically cover the outside of the microcoil sensor wire and cover so as to shield the electrically conductive wire 2 and the elastomeric core 3 as depicted in FIG. 3 or multiple elastomeric filaments 4 as depicted in FIG. 4. The protective covering 5 will typically be comprised of a rubbery polymer or a thermoplastic elastomer. Some representative examples of materials that can be used as the protective or insulating covering include, but are not limited to, natural rubber, polyurethane-polyurea copolymer rubbers, synthetic polyisoprene rubber, polybutadiene rubber, styrene-butadiene rubber, nitrile rubber, ethylene-propylene rubber, and ethylene-propylene-diene monomer rubber, and the like.

The conveyor belts of this invention have an elastomeric body (carcass section) with a load carrying surface on the top side thereof and a pulley engaging surface on the bottom side thereof. These conveyor belts will also include at least one reinforcement ply disposed within the elastomeric body and a multitude of rip detection inserts. The rip detection inserts will be spaced incrementally along the length of the conveyor belt. They can be positioned in the top cover or the puller cover of the belt.

The elastomeric body will normally include plies of fabric or reinforcing steel cables that typically run longitudinally within the conveyor belt. The conveyor belts of this invention can optionally also contain conventional inductive belt damage sensor loops including embedded transducer elements. Conventional rip detection systems of this type are described in U.S. Pat. No. 4,621,727, U.S. Pat. No. 4,854, 446, and U.S. Pat. No. 6,715,602. The teachings of U.S. Pat. No. 4,621,727, U.S. Pat. No. 4,854,446, and U.S. Pat. No. 6,715,602 are incorporated herein by reference for the purpose of disclosing conventional rip detection and identification systems that can be used in conjunction with this invention.

U.S. Pat. No. 6,352,149 B2 discloses a conveyor belt having a rip detection system that utilizes a conventional microcoil sensor wire sensor. The teachings of U.S. Pat. No. 6,352,149 B2 are incorporated by reference herein for the purpose of disclosing such conveyor belts that employ microcoil sensor wire sensors. In any case, U.S. Pat. No. 6,352,149 B2 concerns the use of microcoil sensor wires for conductors utilized for sensors in conveyor belt rip detection systems in order to achieve the objectives of minimizing the thickness of conveyor belt sensors, while at the same time preventing short circuiting at sensor conductor crossovers, and also providing sensor conductors which will resist breakage due to flexure. According to U.S. Pat. No. 6,352, 149 B2, a rip detection sensor for incorporation within a conveyor belt comprises a conductor formed in an endless loop arranged in a signal inverting configuration wherein the conductor crosses itself in at least one crossing place. The conductor is formed as microcoil sensor wire. The conductor crosses itself by crossing through itself such that the microcoil sensor wire resides substantially in a single plane throughout the sensor including the crossing places, and means are provided to prevent short-circuiting of the conductor at the crossing places.

The conveyor belts of U.S. Pat. No. 6,352,149 B2 are characterized in that the short-circuit prevention means comprise insulation coating the conductor, or comprise adhesive applied between the microcoil conductor portions where they cross-through each other. The conveyor belt is further characterized in that the short-circuit prevention means comprise a tee having two grooves in which an elongated portion of the microcoil sensor wire conductor can reside to form a cross-through for the conductor, wherein the grooves are on opposite faces of the tee and are oriented substantially orthogonally to each other. The conveyor belt of U.S. Pat. No. 6,352,149 B2 is further characterized in that the short-circuit prevention means comprise a tee having a first, second, third, and fourth cylindrical dowel, wherein the first and third dowels are on opposed sides of the tee, and the second and fourth dowels are on opposed sides of the tee; such that a first crossing portion of the microcoil sensor wire conductor can be wrapped around the first dowel, elongated to traverse a first side of the tee, and then wrapped around the opposing third dowel; and such that a second crossing portion of the microcoil sensor wire conductor can be wrapped around the second dowel, elongated to traverse a second side of the tee, and then wrapped around the opposing fourth dowel. The microcoil sensor wire conductor can be affixed to the tee with an adhesive. However, in accordance with this invention it is not necessary to use the same junctions at cross over points as because an insulated sheath can be utilized to isolate conductors at cross over points.

Such conveyor belts are also characterized in that the microcoil sensor wire conductor comprises plated or coated high-tensile strength steel. Furthermore, the microcoil sensor wire comprises a coiled conductor with a pitch of between one to four conductor diameters, and a coil diameter of between 0.025 inches (0.635 mm) to 0.175 inches (4.445 mm) and preferably between 0.050 (1.27 mm) to 0.10 inches (2.54 mm). A conveyor belt of this type comprises a top load bearing surface, a middle carcass layer, and a pulley cover, characterized in that the sensor is embedded within any of the three layers. The conveyor belt is also characterized in that the sensor includes loops configured for use in connection with a belt rip detection system which includes external transmitter/exciters, and receiver/detectors.

One aspect of the invention depicted by U.S. Pat. No. 6,352,149 B2 is a method of manufacturing a conveyor belt incorporating within it a rip detection sensor comprising a conductor formed in an endless loop arranged in a substantially figure-eight configuration wherein the conductor crosses itself in at least one crossing place, characterized by: forming the conductor as a microcoiled sensor wire; forming the crossing places such that the microcoil sensor wire conductor crosses through itself and resides substantially in a single plane throughout the sensor including the crossing places; and preventing short-circuiting of the conductor at the crossing places. This method is characterized by insulating the conductor to prevent short-circuiting, or by providing adhesive between the conductor portions at the crossing places. This method may be characterized by providing tees at the crossing places. This method further includes elongating portions of the conductor in the crossing places, wrapping the elongated portions of the conductor around the tees, and possibly affixing the conductor to the tees with adhesive.

A further aspect of this invention depicted by U.S. Pat. No. 6,352,149 B2 is a conveyor belt rip detection system, comprising a conveyor belt incorporating within it a rip detection sensor comprising a conductor formed in an endless loop arranged in a signal inverting configuration wherein the conductor crosses itself in at least one crossing place, and the sensor has loops. The system further comprises a drive motor, a driven pulley driven by the drive motor, a following pulley, an external transmitter and receiver coupled with the sensor loops, and control circuitry controllably connected between the external receiver and a motor controller for controlling the action of the drive motor. The conveyor belt rip detection system is characterized in that the conductor is formed as microcoil sensor wire; the conductor crosses itself by crossing through itself such that the microcoil sensor wire resides substantially in a single plane throughout the sensor including the crossing places; and means are provided to prevent short-circuiting of the conductor at the crossing places. The conveyor belt rip detection system is characterized in that the means to prevent short circuiting is selected from the group consisting of adhesive, insulation coating the conductor, a tee having two grooves, and a tee having a first, second, third, and fourth cylindrical dowel or other non-conductive material positioned to prevent the two or more sections of microcoil from contacting each other.

While certain representative embodiments and details have been shown for the purpose of illustrating the subject invention, it will be apparent to those skilled in this art that various changes and modifications can be made therein without departing from the scope of the subject invention.

What is claimed is:

1. A conveyor belt comprising (1) an elastomeric body having a load carrying surface and a parallel pulley engaging surface; (2) a reinforcement ply disposed within the elastomeric body; and (3) a rip detection sensor in the form of a microcoil sensor wire which is configured in an endless loop, wherein the microcoil sensor wire is comprised of an elastomeric core having an electrically conductive wire spirally wrapped around the elastomeric core, wherein the microcoil wires can stretch with the elastomeric core and wherein the elastomeric core has a higher elongation than the elastomeric body of the conveyor belt, and wherein the electrically conductive wire of the microcoil sensor wire is not mechanically bound to the elastomeric body of the conveyor belt.

2. The conveyor belt as specified in claim 1 wherein the elastomeric core of the microcoil sensor wire is comprised of an insulating elastic polymer selected from the group consisting of natural rubber, polyurethane-polyurea copolymer rubbers, synthetic polyisoprene rubber, polybutadiene rubber, styrene-butadiene rubber, nitrile rubber, ethylene-propylene rubber, and ethylene-propylene-diene monomer rubber.

3. The conveyor belt as specified in claim 1 wherein the electrically conductive wire is comprised of a highly conductive copper alloy having a composition selected from the group consisting of (A) 0.2 to 0.6 weight percent cadmium and 0.2 to 0.6 weight percent chromium with the balance of the alloy being copper and (B) 1 to 4 weight percent nickel and 0.25 to 0.5 weight percent beryllium with the balance of the alloy being copper.

4. The conveyor belt as specified in claim 1 wherein the electrically conductive wire is coated with a metal selected from the group consisting of nickel, tin, and silver.

5. The conveyor belt as specified in claim 1 wherein the microcoil sensor wire is not shielded.

6. The conveyor belt as specified in claim 1 wherein the microcoil sensor wire is shielded with a polymeric electrical insulator.

7. The conveyor belt as specified in claim 1 wherein the microcoil sensor wire has an elongation to break of at least about 150%.

8. The conveyor belt as specified in claim 1 wherein the microcoil sensor wire has an elongation to break of at least 200%.

9. The conveyor belt as specified in claim 1 wherein the microcoil sensor wire has an elongation to break which is within the range of 200% to 500%.

10. The conveyor belt as specified in claim 1 wherein the microcoil sensor wire has a pitch of between 1 to 4 conductor diameters and has a coil diameter of which is within the range of 0.025 to 0.175 inches.

11. The conveyor belt as specified in claim 10 wherein the endless loop is arranged using the microcoil wire in a signal inverting configuration wherein the microcoil sensor wire crosses itself in at least one crossing place by crossing through itself such that the microcoil sensor wire resides substantially in a single plane throughout the sensor including the crossing places.

12. The conveyor belt as specified in claim 11 which is further comprised of a means for preventing short-circuiting or mechanical interaction of the conductor at the crossing places.

13. The conveyor belt as specified in claim 1 wherein the endless loop is arranged in a signal non-inverting configuration wherein the microcoil sensor wire does not cross itself and resides substantially in a single plane throughout the sensor.

14. The conveyor belt as specified in claim 1 wherein the microcoil sensor wire has a pitch of between 1 to 4 conductor diameters and has a coil diameter of between 0.05 to 0.1 inches.

15. The conveyor belt as specified in claim 1 wherein the conveyor belt includes a top load bearing surface, a middle carcass layer, and a pulley cover, characterized in that the sensor is embedded within the bearing surface, the carcass layer or the pulley cover.

16. The conveyor belt as specified in claim 1 characterized in that the rip detection sensor includes loops configured for use in connection with a belt rip detection system which includes external transmitter/exciters, and receiver/detectors.

17. A conveyor system with a rip detection system which is comprised of the conveyor belt as specified in claim 1; a drive motor; a drive pulley which is driven by the drive motor; a following pulley; a transmitter which is coupled with the sensor loops; and an external receiver which is coupled with the sensor loops.

18. In a conveyor belt including (1) an elastomeric body having a load carrying surface and a parallel pulley engaging surface; (2) a reinforcement ply disposed within the elastomeric body; and (3) a rip detection sensor in the form of a microcoil sensor wire which is configured in an endless loop, the improvement which comprises the microcoil sensor wire having an elastomeric core with an electrically conductive wire spirally wrapped around said elastomeric core, wherein the microcoil wires can stretch with the elastomeric core and wherein the elastomeric core has a higher elongation than the elastomeric body of the conveyor belt.

19. The conveyor belt as specified in claim 18 wherein the microcoil sensor wire has a pitch of between 1 to 4 conductor diameters and has a coil diameter of between 0.025 to 0.175 inches; wherein the conveyor belt includes a top load bearing surface, a middle carcass layer, and a pulley cover, characterized in that the sensor is embedded within the load bearing surface, the carcass layer or the pulley cover; and wherein the rip detection sensor loops are configured in non-inverted or inverted constructions for use in connection with a belt rip detection system which includes external transmitter/exciters and receiver/detectors.

20. The conveyor belt as specified in claim 1 wherein the electrically conductive wire is comprised of a highly conductive copper alloy consisting of 0.2 to 0.6 weight percent cadmium and 0.2 to 0.6 weight percent chromium with the balance of the alloy being copper.

\* \* \* \* \*